Patented Apr. 19, 1932

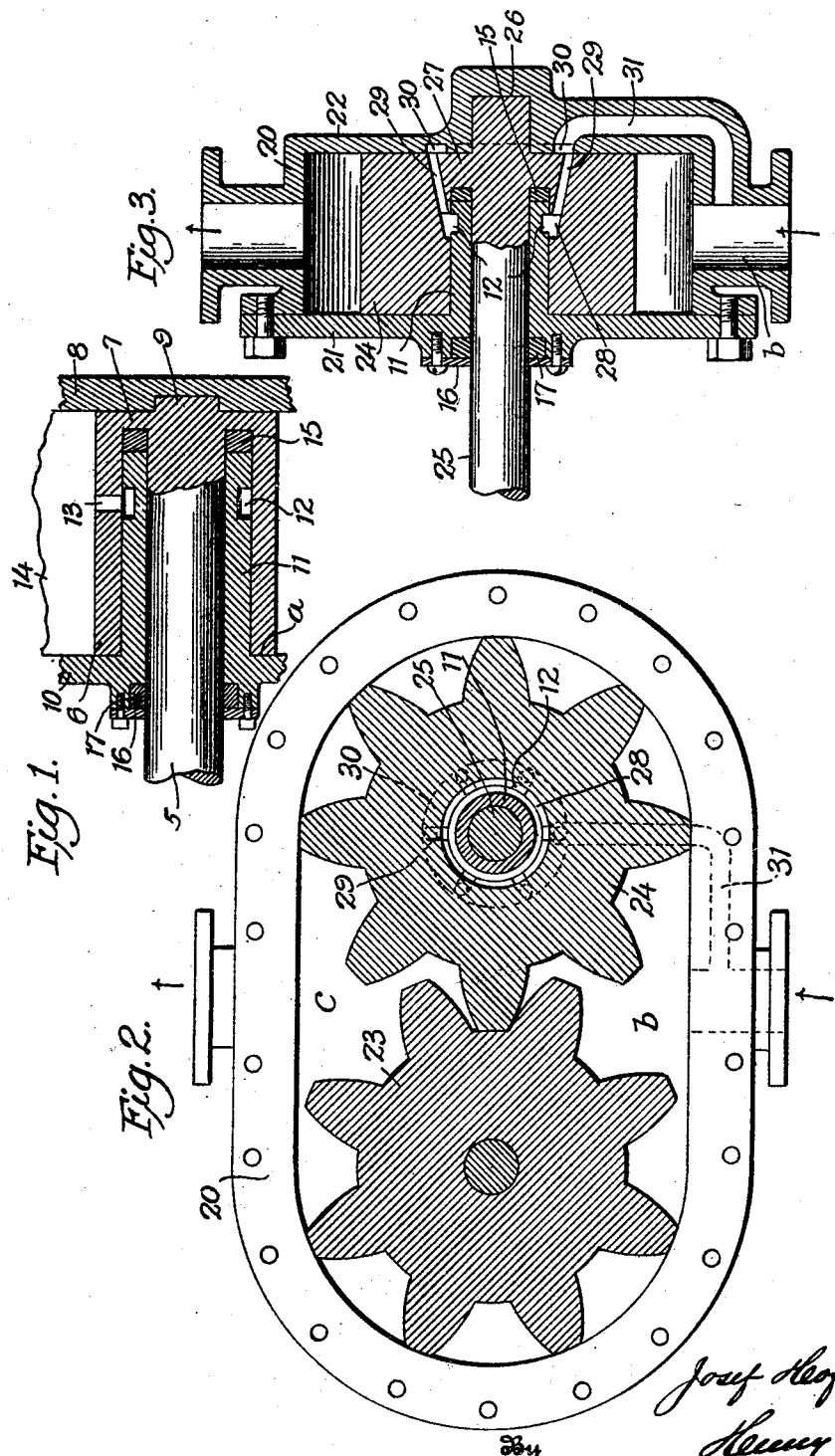

1,854,260

UNITED STATES PATENT OFFICE

JOSEF HOFMANN, OF MERION, PENNSYLVANIA

PACKING DEVICE

Application filed February 13, 1929. Serial No. 339,669.

My invention relates to packing devices for reciprocating and rotating shafts of apparatus in which a high pressure is produced or exists in a chamber or chambers alternately with a low pressure in another chamber.

The invention also relates to a packing device of the type in which the shaft is surrounded by a sleeve or driven member spaced from the shaft but connected thereto, with a gland inserted between the sleeve and shaft, the latter extending through the machine casing to an outside point, the shaft extending through the casing being the one at which leakage is to be prevented.

The invention consists in leading the fluid that has been forced between sleeve and gland to a point of low pressure before it can be forced along the shaft, and preferably by providing a peripheral groove in the exterior surface of the gland, or in the interior surface of the sleeve, or both, which groove is connected to a point of low pressure through one or more ducts of holes in the sleeve member.

Referring to the drawings, in which like parts are similarly designated—

Figure 1 is a diagrammatic cross section of one construction of my packing device, using an oscillating shaft.

Fig. 2 shows my invention applied to a rotary pump of the gear wheel type.

Fig. 3 is a section through one of the pump wheels of Fig. 2.

The pump structures are not my invention, but the packing device for preventing the leakage of fluid along the driving shaft to the exterior of the casings is my invention, and in Figure 1 it comprises the shaft 5 having sleeve-like member 6 surrounding the shaft, spaced from it and connected at its end to the shaft 5 at a point remote from place of exit of the shaft through the machine casing, as at 7.

One end of the shaft 5 is recessed in a casing wall 8, as at 9, and the other end passes out through an opposite casing cover 10, which casing member has a gland member 11 fitting the space between sleeve 6 and shaft 5. Either the sleeve member 6 or the gland member 11, and preferably the latter, has a peripheral groove 12 that is connected by a hole 13 to the low pressure side of a piston or oscillating vane 14.

The gland 11 shown in Figure 1 does not extend to the end of the space between shaft and sleeve, and a soft washer 15 is placed therein to prevent fluid from creeping outwardly along the surface of the shaft 5. A dust cap 16 and soft washer or packing material 17 is preferably used.

During the operation of the pump fluid under pressure will be forced between the abutting surfaces of the sleeve end and casing wall 10 at $a$ and between the outer surface of the gland 11 and inner surface of the sleeve 6 to the groove 12 where it is vented through hole 13 to the low pressure side or to a suction side of the piston.

In Figs. 2 and 3 I have illustrated a rotary gear wheel pump, in which 20 is the casing, 21 and 22 the casing ends and 23 and 24 the two pumping members, the one, 23, is customarily journaled in recesses in the casing covers, and hence has no shaft projecting through a cover that requires packing, while the other member 24 drives the member 23, and has a shaft 25 that projects through cover 21, Fig. 3 for being driven from any suitable source of power. The suction chamber is shown at $b$ and the discharge chamber at $c$. This construction is well known.

According to my invention one driving shaft end has bearing in a recess 26 of casing end 22, is connected to the body of the driving wheel 24 at 27, and spaced from the shaft, so that the body of gear wheel forms the sleeve member. A gland member 11 on casing cover 21 projects into the space between the sleeve member or body of gear wheel 24 and the shaft 25, as in Fig. 1. The gland 11 has a peripheral groove 12, and the sleeve or wheel body also has a peripheral groove 28 connected by bores 29 to a circular groove 30 in the cover 22. The groove 30 is connected by a conduit 31 to the low pressure or suction side of the pump at $b$. A washer 15 may be used, as in Fig. 1.

I claim—

1. In a device of the kind described, means forming a chamber, portions of said chamber being subject to low and high fluid pressures, said chamber having oppositely disposed walls and having a shaft passing through one of said walls of the chamber, the inner end of said shaft being journalled in the opposite wall, means for sealing said chamber against fluid leakage about said shaft comprising a sleeve attached to the wall through which the shaft passes and surrounding the shaft within the casing, a flange on said shaft adjacent the opposite wall and a sleeve on said flange surrounding said first mentioned sleeve, a packing between said flange and the end of the first mentioned sleeve and a duct opening between said sleeves and to a portion of the chamber subject to low fluid pressure.

2. In a device of the kind described, means forming a chamber, portions of said chamber being subject to low and high fluid pressures said chamber having oppositely disposed walls and having a shaft passing through one of said walls of the chamber, the inner end of said shaft being journalled in the opposite wall, means for sealing said chamber against fluid leakage about said shaft comprising a sleeve attached to the wall through which the shaft passes and surrounding the shaft within the casing, a flange on said shaft adjacent the opposite wall and a sleeve on said flange surrounding said first mentioned sleeve, and a packing between said flange and the end of the first mentioned sleeve, one of said sleeves being provided with a duct opening between said sleeves and to a portion of the chamber subject to low fluid pressure.

3. In a device of the kind described, means forming a chamber, portions of said chamber being subject to low and high fluid pressures said chamber having oppositely disposed walls and having a shaft passing through one of said walls of the chamber, the inner end of said shaft being journalled in the opposite wall, means for sealing said chamber against fluid leakage about said shaft comprising a sleeve attached to the wall through which the shaft passes and surrounding the shaft within the casing, a flange on said shaft adjacent the opposite wall and a sleeve on said flange surrounding said first mentioned sleeve, a packing between said flange and first mentioned sleeve, one of said sleeves being provided with a duct opening between said sleeves and one of said chamber walls being provided with a duct connecting said first mentioned duct with a portion of the chamber subject to low fluid pressure.

In testimony that I claim the foregoing as my invention, I have signed my name hereto.

JOSEF HOFMANN.